Sept. 15, 1942.   P. W. THOMAS   2,295,918
TEMPERING MACHINE FOR WHEAT OR THE LIKE
Filed Jan. 8, 1941   2 Sheets-Sheet 1
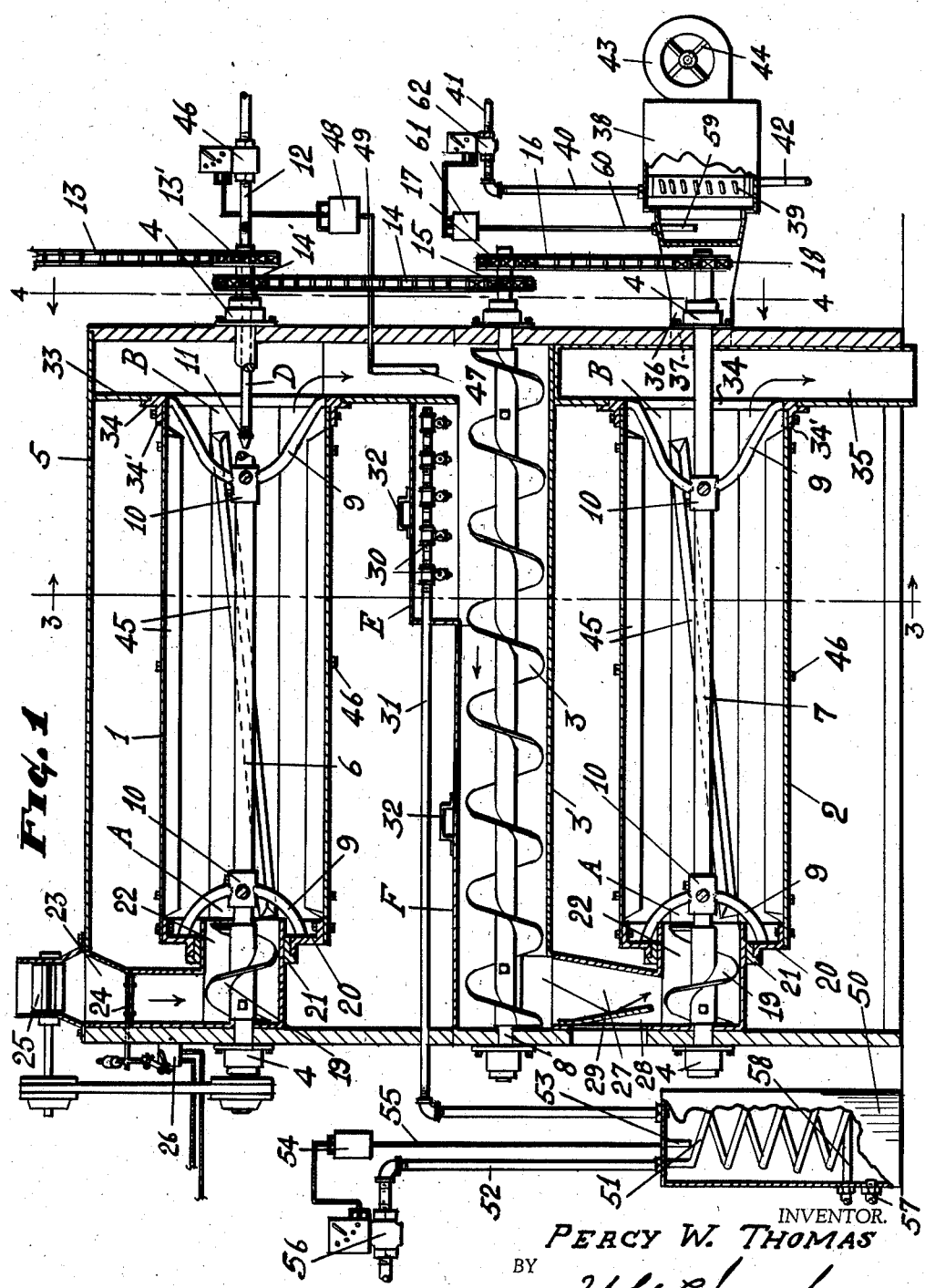
INVENTOR.
PERCY W. THOMAS
BY U.G. Charles

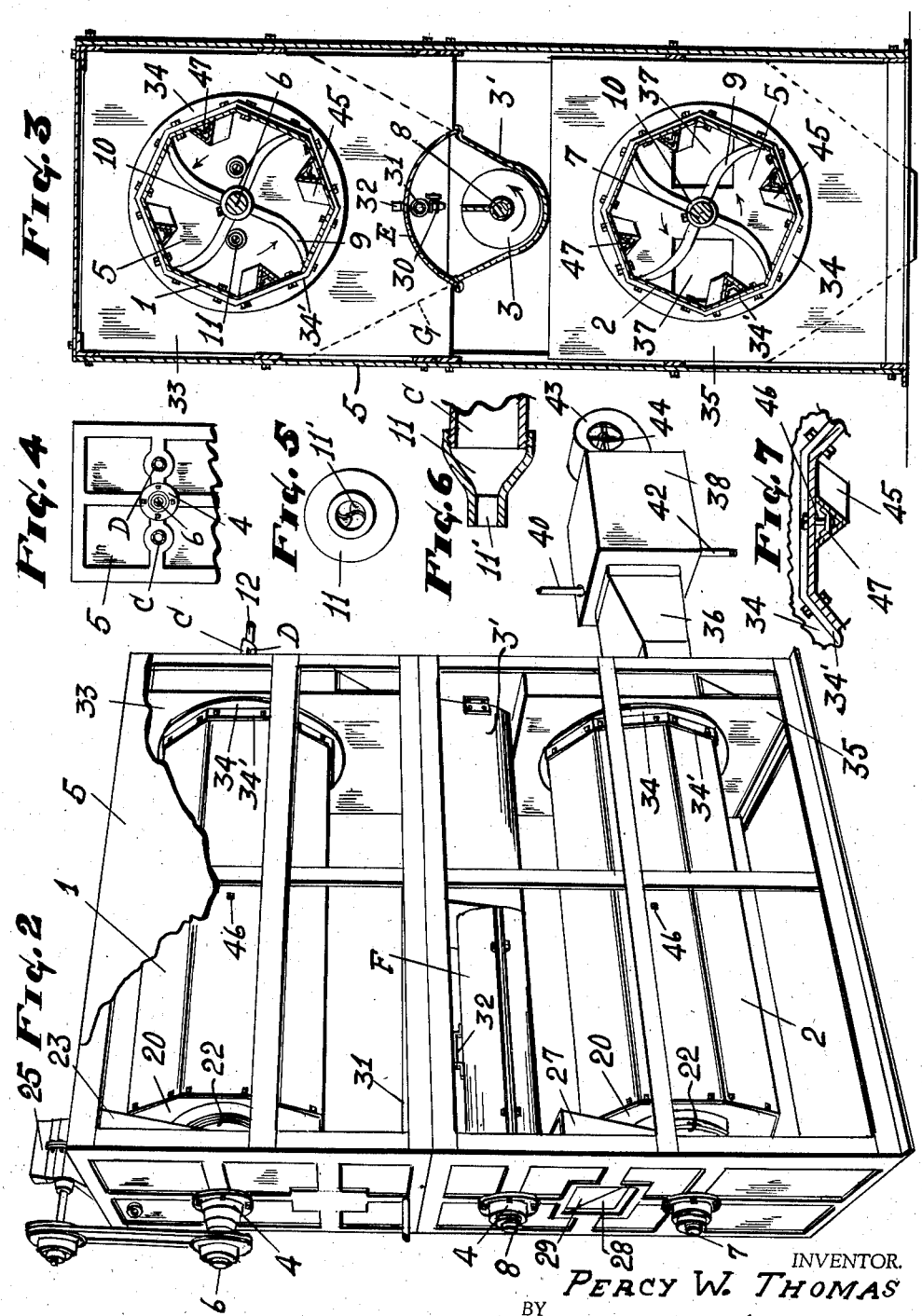

Patented Sept. 15, 1942

2,295,918

UNITED STATES PATENT OFFICE 2,295,918

TEMPERING MACHINE FOR WHEAT OR THE LIKE

Percy W. Thomas, Wichita, Kans.

Application January 8, 1941, Serial No. 373,592

1 Claim. (Cl. 83—27)

This invention relates to certain new and useful improvements not embodied in my former patent, No. 2,237,798, issued April 8, 1941, in which was disclosed a casing having a drum trunnioned near the upper and lower extremity of the casing and an auger trunnioned between the drums, while the objects of this apparatus are to provide new and useful improvements as follows:

First, to provide an auger at the intake end of each drum, and rotatable therewith as a feed for grain into each drum.

Second, to provide diagonally positioned tossing bars, spaced around, and secured to the inside wall of each drum, the sides of each bar converging inward.

Third, to remove the head from the outlet end of each drum for the exit of the grain and each communicating grain tight with their respective hoppers.

Fourth, to inject steam into the upper drum, the orifice of which is adjacent the outlet end of the drum.

Fifth, to provide a tubular housing for the auger between the drums, the housing varying in form and having removable caps.

Sixth, to provide a baffle plate adjacent the outlet end of the lower drum auger, the plate to extend across an exhaust opening in the casing whereby grain dropping from the outlet end of the centrally disposed auger will be retained in the drum auger against a current force of air passing through the lower drum toward the baffle plate.

Seventh, to provide a grain tight sealing means about the auger at the intake ends of the upper and lower drums.

The objects thus pointed out will hereinafter be more fully explained, reference being had to the accompanying drawings forming a part of this specification, in which like characters will apply to like parts in the different views.

Referring to the drawings:

Fig. 1 is a vertical sectional view through the machine along the turning axis of the drums and auger, and other parts removed for convenience of illustration.

Fig. 2 is a perspective view of the machine, the casing partly removed for convenience of illustration.

Fig. 3 is a sectional view taken on line 3—3 in Fig. 1, as directed by the arrows.

Fig. 4 is a reduced end view of the housing adjacent the upper drum as taken on line 4—4 in Fig. 1.

Fig. 5 is an axial view of a steam nozzle.

Fig. 6 is a sectional side view of Fig. 5.

Fig. 7 is an enlarged fragmentary sectional view of the drum shell centrally of the drums longitudinally.

The improvements above pointed out are embodied with their upper and lower drums 1 and 2, respectively, and an auger housing 3' positioned between the drums, the walls of said drums being polygonal in form, while the auger housing is tubular for a portion of its length, the other portion having an extension upward for the purpose later described, said drums and an auger 3 being trunnioned in suitable bearings 4 in the oppositely disposed ends of a casing 5, substantially as shown, the turning axis of which are vertically aligned, the drums and auger each having a shaft 6, 7, and 8 respectively axially secured thereto as turning means therefor.

The upper and lower drums each have curved spokes 9 at oppositely disposed ends of the drum, the spokes being integrally joined to their respective hubs 10 and their respective ends of said drums, substantially as shown, as carrying means therefor.

The inward curvature of the spokes being to inwardly position the inner ends of the augers at the intake end of the drums to insure delivery of the grain through their respective drum heads, while the inward curvature of the spokes at the outlet end of the upper drum is to avoid contact with the ends of the steam jets 11 projecting therein as the drum rotates, each of said jets being subdivided by a twisted element 11' diametrically crossing the orifice as shown in Figs. 5 and 6, by which means the spray body will diverge as ejected, said jets being spaced apart and connected to their respective leg bifurcation C and D of a steam pipe 12 that axially aligns with the turning axis of the upper drum, the crotch of the bifurcation where they join the steam pipe being spaced outward from the outer end of the said drum shaft, the bifurcation being so positioned will straddle link belts 13 and 14 and their respective sprocket wheels 13' and 14', and the said link belt 14 being in mesh with a sprocket wheel 15 that is secured to the auger shaft 8 as turning means therefor, and the said auger shaft is geared to the lower drum shaft 7 through the medium of link belt 16 that is in mesh with sprocket wheels 17 and 18 that are secured to their respective auger and lower drum shaft. It will be seen that link belt 13 is connected with a source of power by which means the said upper and lower drum and auger are turned simultaneously in the same direction.

The hub at the intake end of each upper and lower drum, as heretofore described, is spaced inward to provide ample room for the inner terminal end of an auger 19 that is secured to the drum shaft as a feed for grain into the drum, said auger extending through a centrally disposed flanged opening in the drum head 20 in which is rotatably positioned a bearing 21 that is secured to auger casing 22, by which means the casing of the auger enters the drum grain tight, the outer end of which is secured to the end casing of the machine.

Upwardly extending and carried by the upper auger casing is a hopper 23 as a conductor for grain to the auger, said hopper having a rockable plate 24 and a flutter wheel 25 to govern the quantity flow of wheat over the plate, and the said plate being means to make and break an electric supply current for the machine through the medium of a switch 26 connected thereto, the current supply being for automatic control for the supply of steam and water in the process of tempering wheat as it flows through the machine.

The lower drum has a conductor 27 for grain from the auger into said drums. It will be seen that this auger is likewise encased, there being an opening in the casing to register with the conductor 27 and through which the grain will flow as discharged from the auger. The said conductor is likewise connected at its lower end to discharge in an opening provided in the lower drum auger casing, by which means grain from the intermediate auger is conducted into the lower drum and being suspended by the rotation thereof as it moves toward the other end of said lower drum, in which action a current of air is introduced by an air conditioning mechanism (later described), the air current passing through the drum and outward therefrom through an opening 28 in the machine casing at which point a baffle plate 29 extends across the opening and slanting inward of the last said conductor to permit exhaust of air through said opening.

It will be seen that the housing 3' for the auger 3 from its intake end to near its center thereof extends vertically from the auger sufficient to house a plurality of water spray nozzles 30 that are spaced apart and connect to a water pipe 31 as a supply therefor whereby grain conveyed by the auger is moistened and well mixed thereby along its path toward the outlet end of the auger housing. The said auger housing has a removable cap E adjacent the water spray nozzles, and a removable cap F for the tubular portion of the housing, each being removably attached as a convenient means to inspect the spray nozzles and auger, and each of said caps having a handle 32 as a means to remove said caps.

At the outer end of drum 1 is a hopper 33 to conduct grain from said drum to the intake end of the auger, said hopper having a circular opening through its side adjacent the drum and through which the end of said drum extends grain tight but free to rotate therein. Inasmuch as the opening in the hopper is circular it will be seen that the end of the drum has an annular flanged head 34 attached thereto, the flange 34' of which is polygonal to rest on the polygonal walls of the drum and being secured thereto while the outer peripheral edge of the head has an offset inward to engage through the wall of the hopper as the drum rotates, the lower end of said hopper having convergent walls as shown by dotted lines G by which means the grain is conducted into the auger housing substantially as shown in Fig. 3.

Furthermore, the said lower drum 2 at its outlet end B has a similar hopper 35 and a similar flanged head to that above described for drum 1, the last said hopper being to discharge the grain as treated by the machine.

The air conditioner above referred to consists of; a bifurcated duct 36, the legs of which terminate at the casing wall, each being in registry with their respective openings 37 formed in the casing, said openings to communicate with the interior of the lower drum oppositely with respect to the diametrical axis thereof, by which means distribution of the current is had while passing through and outward at the other end of said drum, and the said duct is connected to a chamber 38 in which is positioned a radiator 39 heated by steam conducted therein through a pipe 40, extending from the main line 41 that is fed by a steam plant (said plant not shown in the drawings), and outward through a return 43 as circulating means for the steam through the radiator as a heater for the circulated air. Connected to the outer end of said chamber is a duct 43 through which air from a fan 44 will enter the chamber and exhaust outward therefrom through the radiator and bifurcated duct, said fan being actuated by an electric motor, not shown in the drawings.

As an efficient means to suspend the grain in the drums so that each kernel will be treated throughout its entire surface with steam and air is as follows; positioned in the upper and lower drums is a plurality of bars 45, V-shaped in cross section to function as suspending means for the grain. It will be seen that the said bars extend longitudinally of the drums and slantingly positioned on the wall thereof, the slant of the bars coinciding to direct the grain from the intake and toward the outlet ends as the drums rotate. Coacting with the bars is the auger feed to conduct the grain inward at the intake end as above stated and from thence conducted onward toward the outlet ends of the drums, each bar being secured at intervals therealong by bolts 46 extending through the wall of the drums, each having a nut threadedly engaging thereon as tightening means, the other ends of the bolts being secured to lugs 47 welded to the bar.

Positioned on steam pipe 12 is a steam controlling valve 46, said valve arranged to control the steam passing outward through the said steam jets that enter the drum a short distance at the grain outlet end of the drum as a means to raise a desired temperature of the wheat contained in the drum, which in its rotation will agitate by tumbling the grain to insure the steam vapor uniformity of contact with the kernel of the wheat as it passes through and outward as above described, it being understood that the ejection of the steam is against the flow of the grain passing through the drum. Inasmuch as the wheat must arrive at the intake end of the auger at a predetermined temperature, the same is controlled by a bulb 47 over which the wheat will flow, by which means the bulb will act upon a temperature controller 48, through the medium of a capillarity cable 49; said controller 48 in turn acting upon valve 46 to govern the flow of steam as it enters the drum at the grain outlet end.

In Fig. 1 is shown a hot water tank 50 having a steam heating coil 51 positioned therein as shown, said coil being connected to a steam lateral pipe 52 that is supplied by a source of steam, and the said hot water tank has a control temperature bulb 53 extending therein and being connected to a temperature controller 54 by a capillarity cable 55 as actuating means for said controller to maintain a predetermined temperature of the water contained in said tank through the medium of a steam controlling valve 56 that is automatically controlled by the temperature of the water in said tank to increase or decrease the steam pressure in said heating coil, whereby a predetermined temperature of the water is maintained, said water being supplied through a pipe 57 extending to a pressure source of supply, (the latter not being shown in the drawings), and the said steam coil having a pipe 58 as a return to the steam source of supply whereby circulation of the steam through the coil is had.

To maintain a predetermined temperature of the air entering drum 2 there is positioned within the body of said duct 36 a bulb 59 having a capillarity cable 60 to connect said bulb with a temperature controller 61 which in turn will control the flow of steam by acting upon controlling valve 62 to vary the temperature of the air circulating through the said air conditioner by which means superfluous moisture is evaporated from the wheat externally, which in turn will cool the grain to milling temperature by evaporative refrigeration.

And modifications may be made as lie within the scope of the appended claim.

Having fully described my invention what I claim as new and desire to secure by Letters Patent is:

In a grain tempering machine, an imperforate rotatable drum with feed and discharge ends, a shaft centrally mounted fast to said drum, means to rotate said shaft, a feed auger on the shaft extending outwardly from the feed end of the drum, means to conduct wheat into the auger, peripheral grain lifting means within the drum so constructed and arranged as to lift and drop the grain and progress it away from the feed auger and thru the drum to its discharge end, steam heating means for the grain located at the discharge end of the drum comprising a stationary bifurcated steam pipe with jets on the ends of the bifurcations, the bifurcations straddling the shaft and the jets being directed into the drum and towards its feed end, and a source of steam supply for the pipe, whereby counter current of grain and steam is obtained.

PERCY W. THOMAS.